(12) United States Patent
Gebke et al.

(10) Patent No.: US 9,039,503 B2
(45) Date of Patent: May 26, 2015

(54) LONGITUDINALLY SPLIT FABRIC AIR DUCT

(75) Inventors: Kevin J. Gebke, Dubuque, IA (US); Frank Heim, Platteville, WI (US); Nicolas B. Paschke, Mequon, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 413 days.

(21) Appl. No.: 12/040,614

(22) Filed: Feb. 29, 2008

(65) Prior Publication Data

US 2009/0221226 A1 Sep. 3, 2009

(51) Int. Cl.
| | |
|---|---|
| F24F 13/068 | (2006.01) |
| F24F 13/02 | (2006.01) |
| F16L 11/02 | (2006.01) |
| F16L 31/02 | (2006.01) |
| F24F 13/06 | (2006.01) |

(52) U.S. Cl.
CPC ............. *F24F 13/0209* (2013.01); *F16L 11/02* (2013.01); *F16L 31/02* (2013.01); *F24F 13/0218* (2013.01); *F24F 13/068* (2013.01); *F24F 2013/0608* (2013.01)

(58) Field of Classification Search
CPC .................................................. F24F 13/0218
USPC ......... 454/298, 297, 296, 306, 334, 903, 906, 454/292, 299; 138/162; 24/580.1
See application file for complete search history.

(56) References Cited

U.S. PATENT DOCUMENTS

| | | | |
|---|---|---|---|
| 2,423,241 A | 7/1947 | Kurth et al. | |
| 3,195,296 A | 7/1965 | Janson | |
| 3,204,391 A * | 9/1965 | Schwab | 55/374 |
| 3,357,088 A | 12/1967 | Hoffman et al. | |
| 3,607,341 A | 9/1971 | Goins et al. | |
| 3,875,623 A * | 4/1975 | Johnston | 24/580.1 |
| 3,911,962 A | 10/1975 | Chomat et al. | |

(Continued)

FOREIGN PATENT DOCUMENTS

| | | |
|---|---|---|
| CN | 1108378 | 9/1995 |
| DE | 8516329 | 7/1985 |

(Continued)

OTHER PUBLICATIONS

EP856709A1 Translation.*

(Continued)

*Primary Examiner* — Steven B McAllister
*Assistant Examiner* — Brittany Towns
(74) *Attorney, Agent, or Firm* — Hanley, Flight and Zimmerman, LLC (57) ABSTRACT

An air duct assembly includes upper and lower pliable sheets that can be assembled in a sequence that makes the assembly easier to install and later easier to remove for periodic cleaning. To install the assembly, the upper sheet can be installed first by inserting the edges of the upper sheet within a pair of tracks and then fastening the upper sheet to a vertical supply air duct. An optional airflow modifier (e.g., filter, airflow turning vane, or noise attenuator) can be install where the supply air duct connects to the upper sheet. Once the upper sheet is suspended from the tracks and fastened to the main supply air duct, the lower sheet can be installed separately. Pliable end panels and pliable fasteners (e.g., zipper or VEL-CRO fastener) can make most of the air duct assembly machine washable. The upper and lower sheets can have different degrees of air permeability.

30 Claims, 8 Drawing Sheets

(56) References Cited

U.S. PATENT DOCUMENTS

| | | | |
|---|---|---|---|
| 3,940,017 A | | 2/1976 | Borgstrom |
| 4,017,282 A | | 4/1977 | Zahka et al. |
| 4,159,674 A | * | 7/1979 | Brumleu, Jr. ............... 454/297 |
| 4,463,483 A | | 8/1984 | Holm |
| 4,699,133 A | | 10/1987 | Schafer et al. |
| 4,890,544 A | | 1/1990 | Aalto et al. |
| 4,951,366 A | | 8/1990 | Geller |
| 5,024,877 A | | 6/1991 | McCullough et al. |
| 5,095,942 A | | 3/1992 | Murphy |
| 5,111,739 A | * | 5/1992 | Hall ............................. 454/306 |
| 5,123,595 A | | 6/1992 | Doss |
| 5,167,577 A | * | 12/1992 | Kristensson ................ 454/298 |
| 5,368,341 A | | 11/1994 | Larson |
| 5,401,793 A | | 3/1995 | Kobayashi et al. |
| 5,490,813 A | | 2/1996 | Danielsen et al. |
| 5,655,963 A | | 8/1997 | Paschke et al. |
| 5,725,427 A | | 3/1998 | Koerber |
| 5,735,738 A | * | 4/1998 | Kuno et al. ................. 454/296 |
| 5,769,708 A | | 6/1998 | Paschke |
| 5,782,689 A | * | 7/1998 | Woolsey et al. ............ 454/296 |
| 5,855,154 A | | 1/1999 | Schakel et al. |
| 5,961,044 A | | 10/1999 | Dalbec et al. |
| 5,996,281 A | | 12/1999 | Takano et al. |
| 6,002,333 A | | 12/1999 | Hickey |
| 6,113,486 A | | 9/2000 | Beudon et al. |
| 6,280,320 B1 | * | 8/2001 | Paschke et al. .............. 454/298 |
| 6,419,576 B1 | * | 7/2002 | Han ............................. 454/338 |
| 6,958,011 B2 | | 10/2005 | Gebke |
| 2002/0155805 A1 | | 10/2002 | Paschke |
| 2005/0250436 A1 | * | 11/2005 | Nilsson ....................... 454/187 |

FOREIGN PATENT DOCUMENTS

| | | |
|---|---|---|
| DE | 20000418 | 5/2000 |
| EP | 0175892 | 5/1988 |
| EP | 0840072 A2 | 5/1998 |
| EP | 0856709 | 8/1998 |
| EP | 899519 A1 * | 3/1999 |
| EP | 0899519 A1 | 3/1999 |
| EP | 0840072 A3 | 2/2000 |
| EP | 0899519 B1 | 5/2000 |
| EP | 1091179 | 4/2001 |
| FR | 2713317 | 9/1995 |
| JP | 63003143 | 1/1988 |
| JP | 03110342 | 5/1991 |
| JP | 06094295 | 4/1994 |
| WO | 03012344 | 2/2003 |

OTHER PUBLICATIONS

Q-Duct Installation Instructions, Q-Duct Incorporated, Jun. 1999, 7 pages.
International Searching Authority, "International Search Report," issued in connection with international application No. PCT/US2009/035159, mailed Jul. 3, 2009, 4 pages.
International Searching Authority, "Written Opinion of the International Searching Authority," issued in connection with international application No. PCT/US2009/035159, mailed Jul. 3, 2009, 7 pages.
International Bureau, "International Preliminary Report on Patentability," issued in connection with international application serial No. PCT/US2009/035159, issued Aug. 31, 2010, 8 pages.
Canadian Intellectual Property Office, "Office Action," issued in connection with Canadian Patent Application No. 2,716,126, mailed on Jun. 14, 2012, 4 pages.
Chinese State Intellectual Property Office, "Second Office Action," issued in connection with Chinese Patent Application No. 200980106541.X, and it's English translation, mailed on Jun. 27, 2012, 25 pages.
IP Australia, "Notice of Acceptance," issued in connection with Australian Patent Application No. 2009222205, dated May 2, 2013 (4 pages).
CIPO, "Notice of Allowance," issued in connection with Canadian Patent Application No. 2,716,126 dated Mar. 5, 2013 (1 page).
State Intellectual Property Office, "First Office Action", issued in connection with Chinese Patent Application No. 200980106541.X, mailed on Oct. 10, 2011, 21 pages.
Australian Patent Office, "First Examiner's Report," issued in connection with Australian Patent Application No. 2009222205, mailed on Apr. 13, 2012, 2 pages.

* cited by examiner

LONGITUDINALLY SPLIT FABRIC AIR DUCT

FIELD OF THE DISCLOSURE

The subject disclosure generally pertains to air ducts and more specifically to fabric air ducts.

BACKGROUND

To distribute supply air throughout a building, fabric air ducts are often preferred over sheet metal ones for various reasons. Fabric ducts can evenly distribute the air, can be less prone to surface condensation, have a nice appearance, are lightweight, and are usually removable for periodic cleaning. Fabric ducts, nonetheless, do have some drawbacks.

Fabric ducts, for instance, can sometimes be difficult to remove and attach to a main supply air duct. In some cases, the point of attachment is at a location with limited accessibility, particularly if the main supply air duct is directly above the fabric duct.

Some fabric ducts have rigid pieces that are unsuitable for cleaning by conventional fabric washing machines (e.g., item 60 of U.S. Pat. No. 6,280,320 and item 24 of published U.S. Patent Application No. 2002/0155805).

In some applications, it is desirable to have an air duct made of a fabric that is more air permeable in some areas than others. For example, there might be a need for more airflow below the duct than above it. This could be accomplished by joining fabrics of different permeability; however, sewing together different materials does not always work well.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Figure 1:
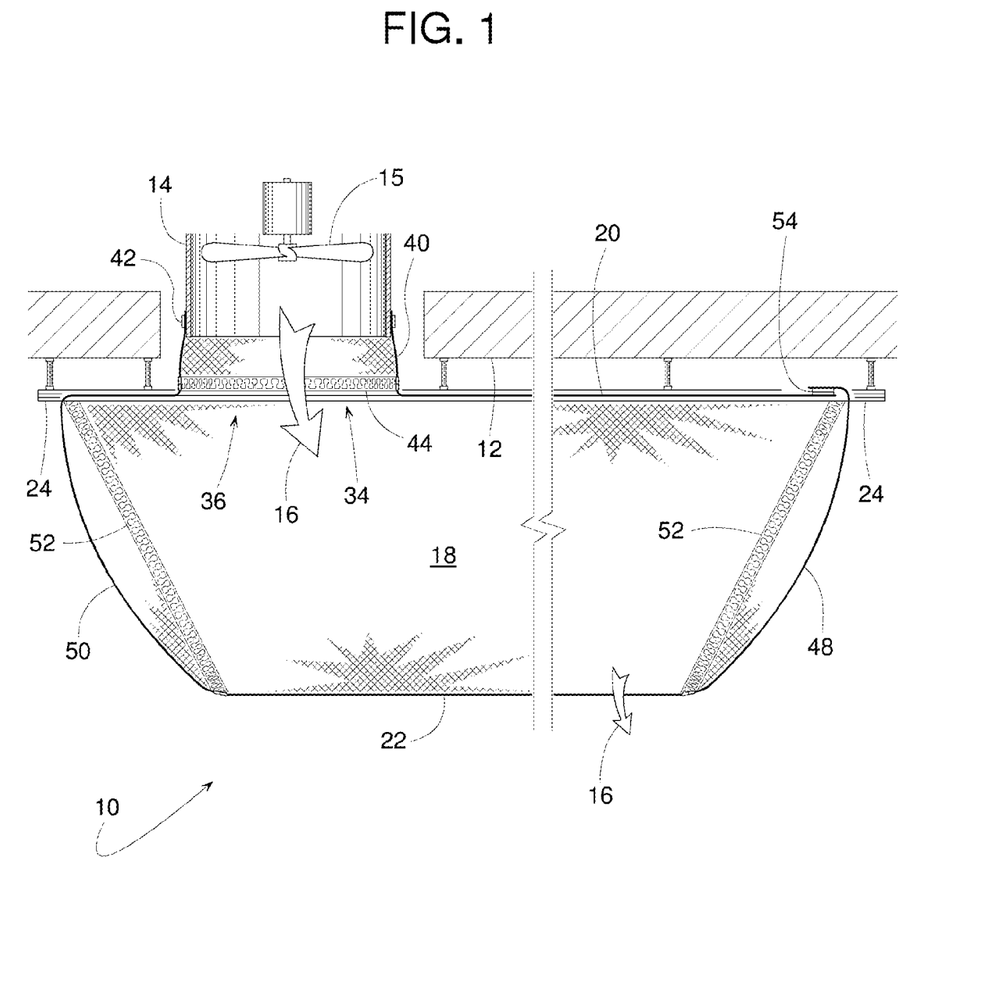
FIG. 1 is a side cross-sectional view of an example air duct assembly comprising at least two pliable sheets.
Figure 2:
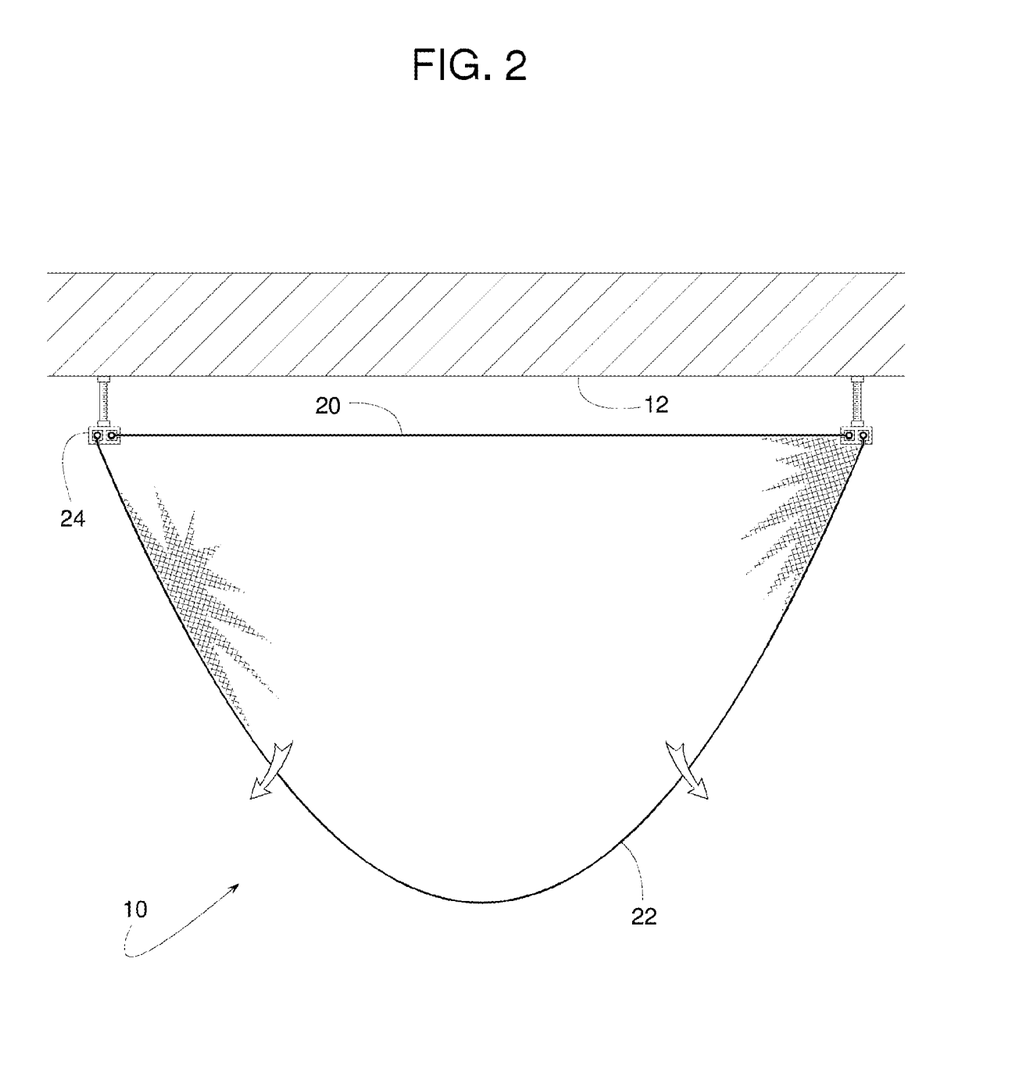
FIG. 2 is a cross-sectional view taken along line 2-2 of FIG. 1.
Figure 3:
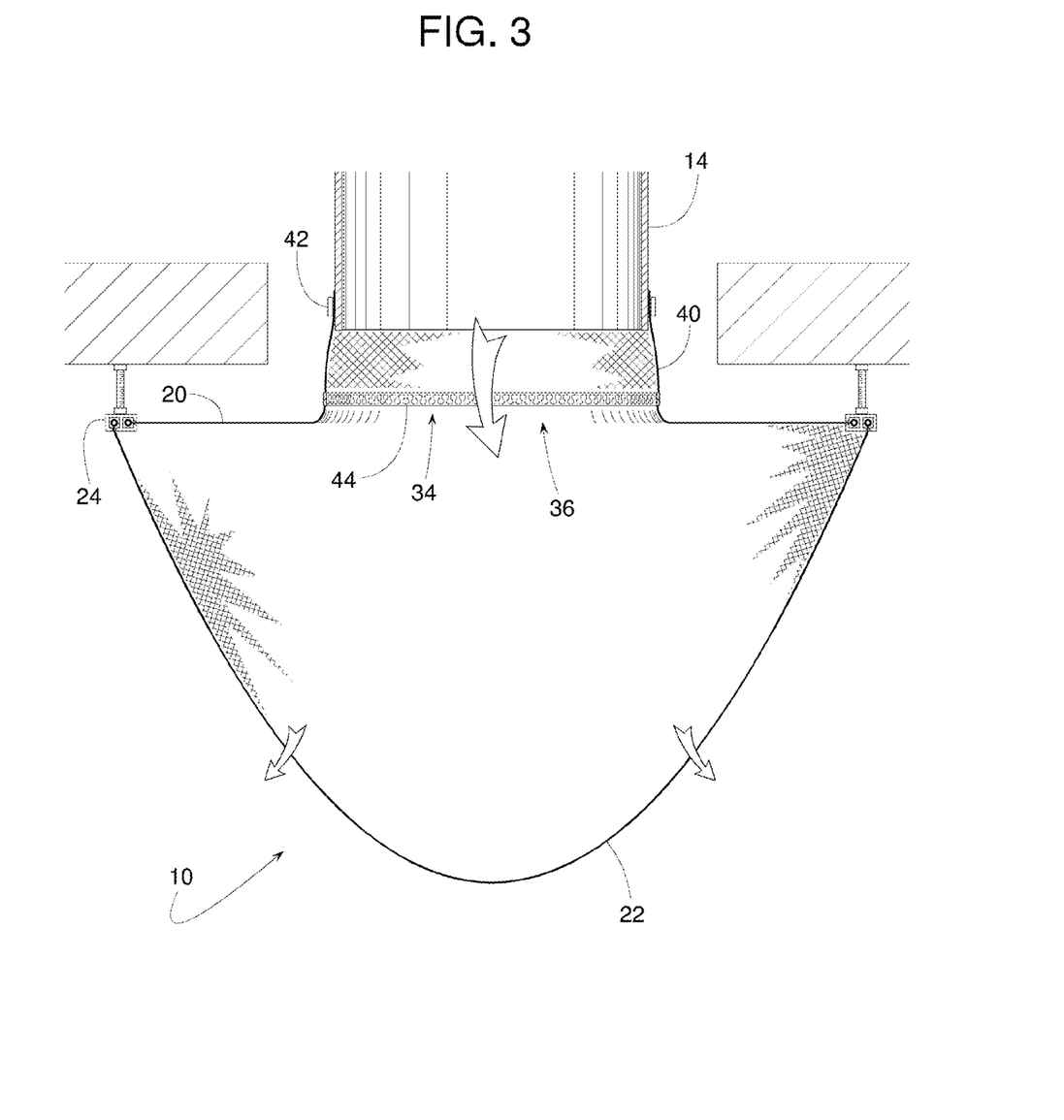
FIG. 3 is a cross-sectional view taken along line 3-3 of FIG. 1.

FIGS. 1-3 show an air duct assembly 10 suspended below a ceiling 12 of a building and connected to a vertically extending inlet air duct 14. A blower 15 forces air 16 through duct 14 and through a horizontally extending air passageway 18 that is between an upper sheet 20 and a lower sheet 22 of duct assembly 10. Outlet openings or the air permeability of at least one of sheets 20 and 22 can disperse the air into various rooms or areas within the building.

Sheets 20 and 22 are each made of a pliable material (e.g., an air permeable or impermeable fabric) that can be removed from its supporting structure for cleaning (e.g., in a washing machine). Sheets 20 and 22 can be made of the same or different materials to provide air duct assembly 10 with certain airflow characteristics or other desirable properties such as appearance, strength, and different or identical air permeability.

Figure 4:
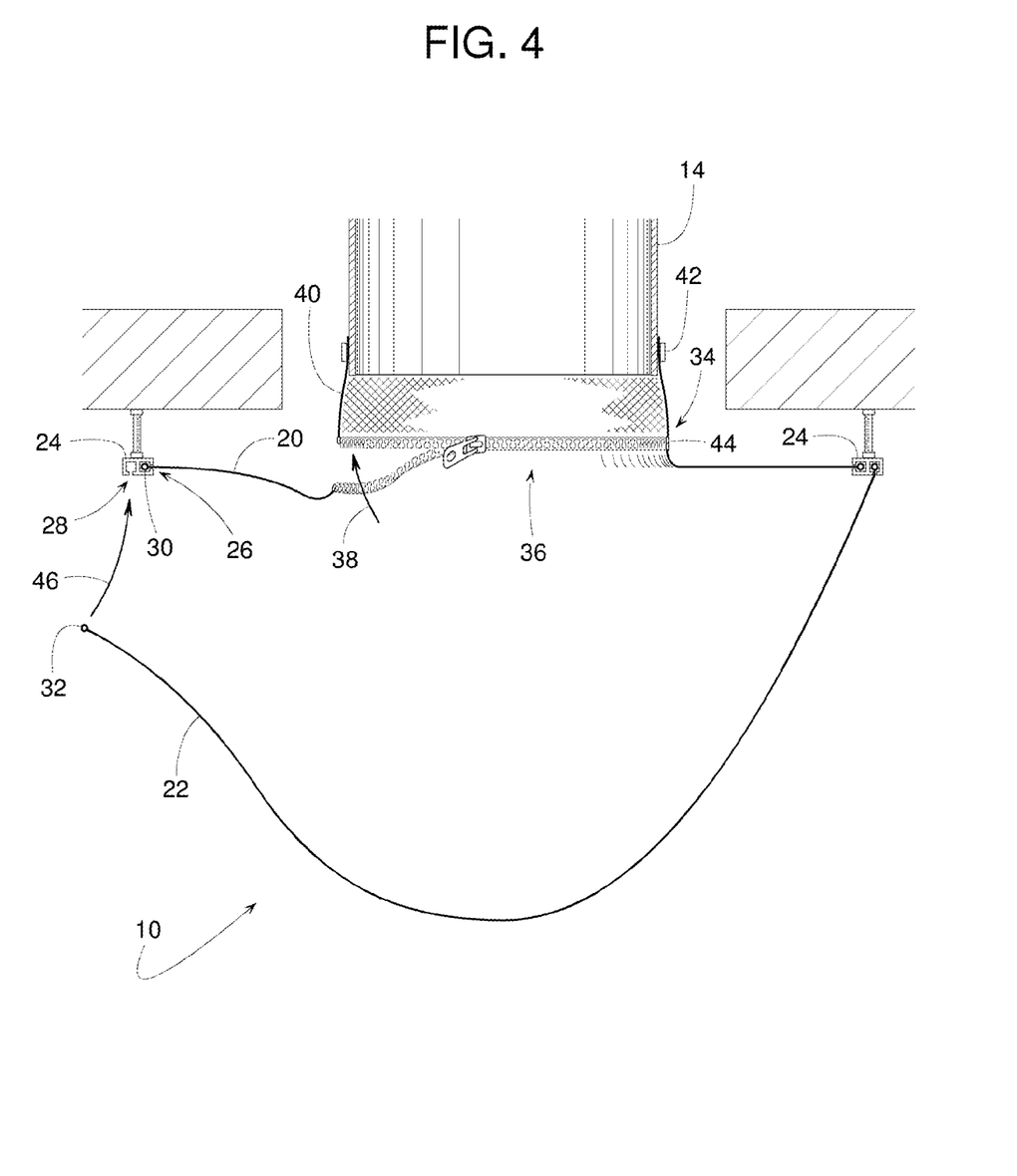
FIG. 4 is a cross-sectional view similar to FIG. 3 but showing the air duct in the process of being assembled.

Turning now to the example of FIG. 4, to ease the installation and removal of sheets 20 and 22 the sheets 20 and 22 can be supported by two tracks 24, each of which define a first channel 26 and a second channel 28. To support upper sheet 20, a pair of elongate beads 30 on upper sheet 20 can be slid lengthwise into first channel 26. Likewise, a pair of elongate beads 32 on lower sheet 22 can be slid into second channel 28. However, the upper sheet 20 and/or the lower sheet 22 may be supported by any other suitable method. Before completely installing lower sheet 22, however, it may be more convenient to first connect upper sheet 20 to inlet duct 14, otherwise lower sheet 22 may obstruct access to inlet duct 14.

In this example, a first separable joint 34 can be used for connecting inlet duct 14 in fluid communication with an inlet opening 36 defined by upper sheet 20. An arrow 38 represents the step of removably coupling upper sheet 20 to inlet duct 14. In some examples, joint 34 includes a pliable tube 40 that is fastened via a clamp 42 or otherwise attached to inlet duct 14, and a pliable fastener 44 removably connects tube 40 to the perimeter of opening 36. Examples of pliable fastener 44 include, but are not limited to, a zipper or a hook-and-loop fastener such a VELCRO fastener, wherein VELCRO is a registered trademark of Velcro Industries of Manchester, N.H.

After inlet duct 14 is coupled to upper sheet 20, lower sheet 22 can be completely inserted into channel 28, whereby an arrow 46 represents the step of finish coupling lower sheet 22 to upper sheet 20.

Once sheets 20 and 22 are installed, a first pliable end panel 48 (FIG. 1) and a second pliable end panel 50 can be installed to prevent air 16 from blowing freely out the ends of duct assembly 10. Panels 48 and 50 can be permeable or impermeable to air. Panels 48 and 50 can also be completely separate items or they can be an integral extension of upper sheet 20 or lower sheet 22. End panel 48 is an example of a completely separate item fastened to sheets 20 and 22 by way of a zipper 52 and a hook-and-loop fastener 54, respectively. End panel 50 is an integral extension of upper sheet 20, while zipper 52 removably fastens panel 50 to lower sheet 22. However, the panels 48 and/or 50 may be removably coupled to the lower sheet 20 and/or the upper sheet 22 by any suitable method.

Figure 5:
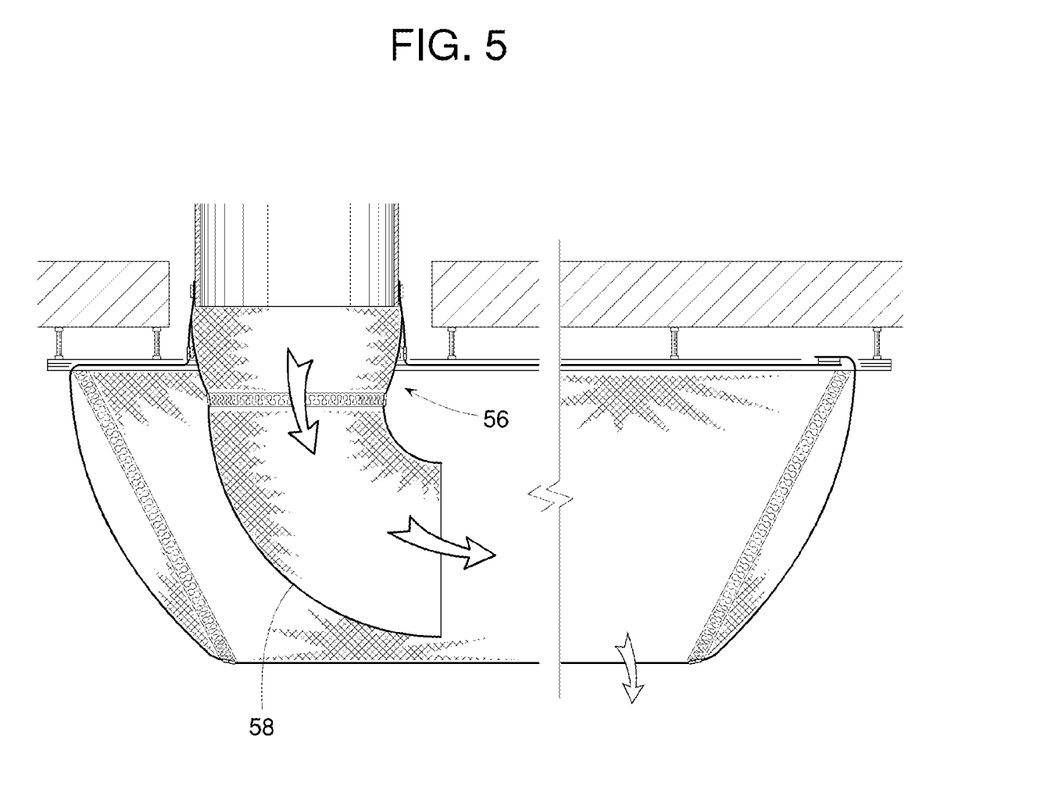
FIG. 5 is a side cross-sectional view similar to FIG. 1 but showing an air duct assembly that includes an airflow modifier.

Referring to FIG. 5, a separable joint 56 can also provide a convenient location for adding an airflow modifier 58. Examples of airflow modifier 58 include, but are not limited to, a filter, airflow turning vane, noise attenuator, etc. Airflow modifier 58 can be attached using any suitable fastener including, but not limited to, a zipper, hook-and-loop fastener, etc.

Figure 6:
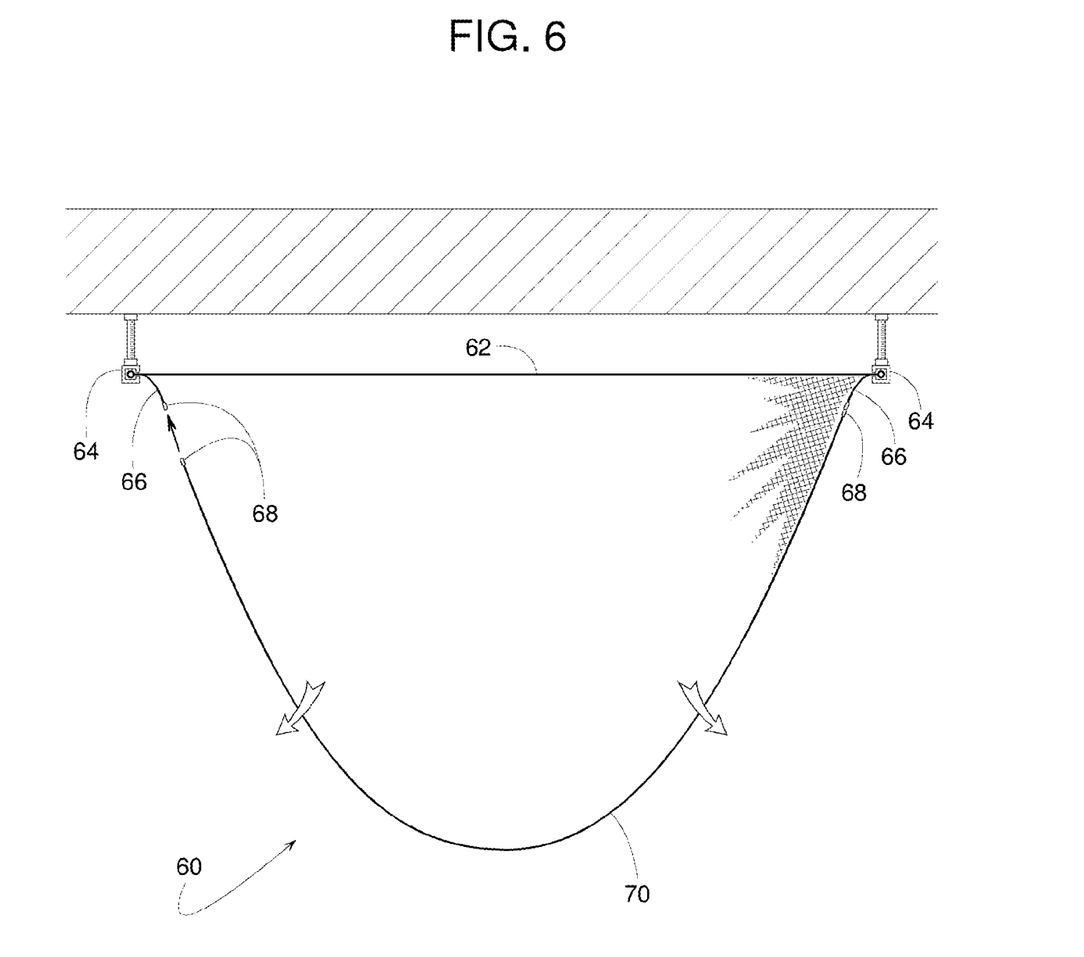
FIG. 6 is a cross-sectional view similar to FIG. 2 but showing an alternate example.
Figure 7:
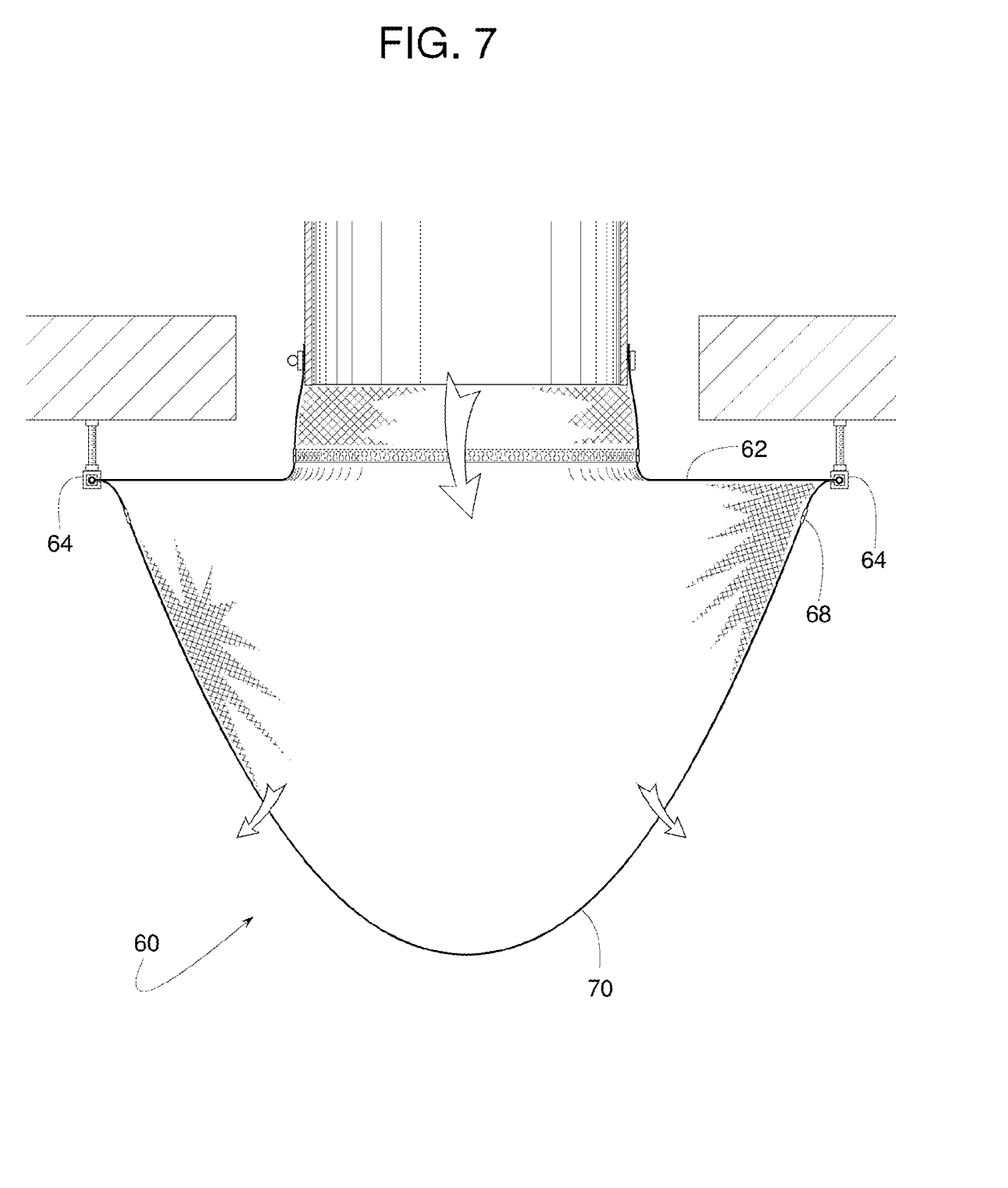
FIG. 7 is a cross-sectional view similar to FIG. 3 but showing the example of FIG. 6.

Although FIGS. 2 and 3 show one way of providing a longitudinal separable joint between two pliable sheets, there are many other ways of doing this. An air duct assembly 60 of FIGS. 6 and 7, for example, shows an upper sheet 62 supported by a pair of single-channel tracks 64. Upper sheet 62 includes two strips of material 66 with a pliable fastener 68 (e.g., zipper or hook-and-loop) that removably connects to a lower sheet 70. The structure and function of air duct assembly 60 can otherwise be similar to that of duct assembly 10.

Figure 5A:
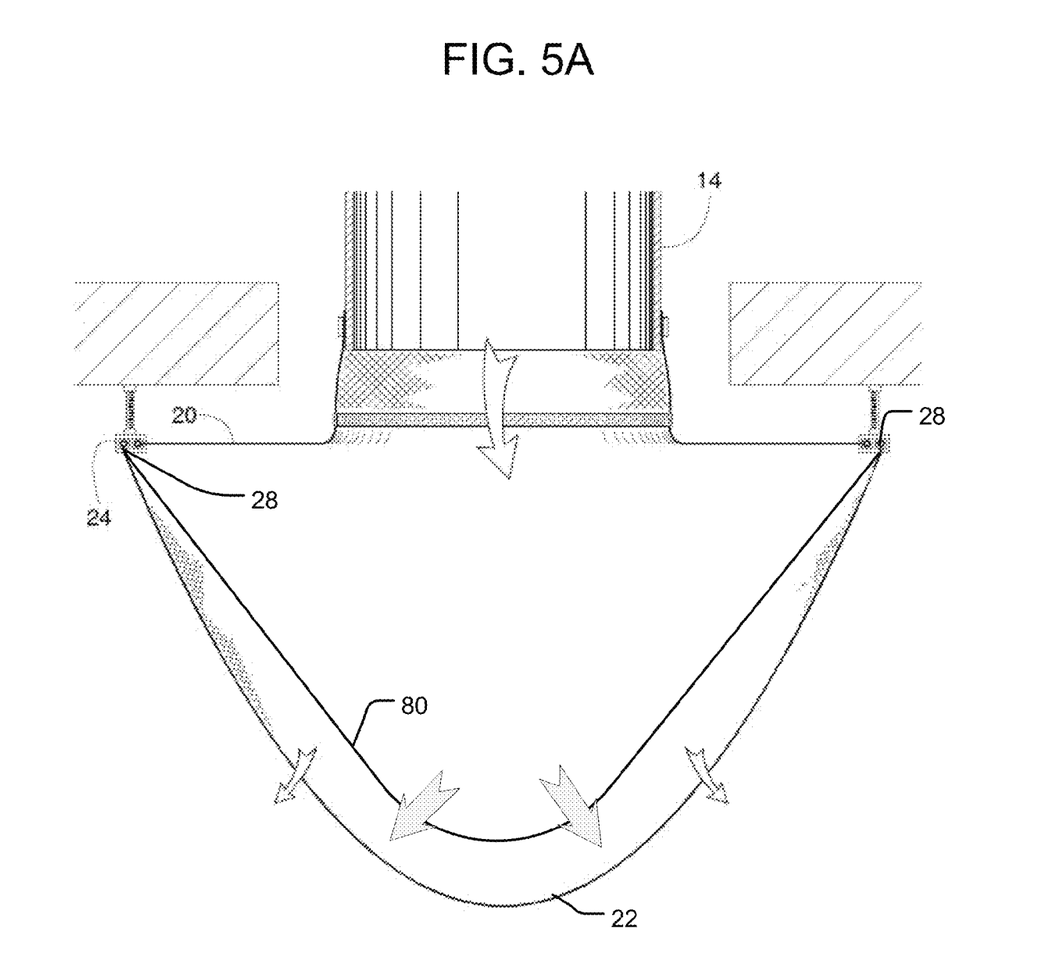
FIG. 5A is a side cross-sectional view similar to FIG. 3 but showing an air duct assembly that includes a fabric member.

The example of FIG. 5A includes a fabric member 80 positioned across the inlet duct 14 to modify airflow and/or air pressure to minimize flutter. To support fabric member 80 and lower sheet 22, a pair of elongate beads 82 are slid into second channel 28. In this example, elongate beads 82 of fabric member 80 and lower sheet 22 are the same. However, fabric member 80 may be supported using any suitable method and tracks 24 may include any number of channels (3, 4, etc.). Additionally, in some examples, additional fabric members 80 may be included (e.g., 2, 3, 4, etc.) that are positioned at a distance from one another.

Fabric member 80 may include a single layer of pliable material (e.g., an air permeable or impermeable fabric) or a plurality of layers of pliable material. The fabric member 80 may include any number (e.g., 1, 2, 3, etc.) of areas (e.g., sections) that may be made of the same or different materials that have similar or different characteristics, such as, for example, strength, and/or air permeability. Additionally, the different areas may be the same or different sizes. In some examples, the fabric member 80 may include areas of varying porosity such as, for example, an area that is a first porosity and an area that is a second porosity.

From the foregoing, it can be seen that fabric air ducts and method of making and/or using the same have been disclosed. In some examples, an air duct assembly includes upper and lower pliable sheets that are joined longitudinally to make it easier to attach the upper sheet to a vertical main supply air duct made of relatively rigid sheet metal.

In some examples, upper and lower pliable sheets are suspended from separate track channels so that the sheets can be installed individually.

In some examples, an air duct assembly includes separate upper and lower sheets that are sufficiently pliable to machine-wash them individually.

In some examples, a single track member includes two channels to support two individual pliable sheets.

In some examples, an air duct assembly includes upper and lower sheets plus two pliable end panels that are joined to the sheets by way of at least one pliable fastener.

In some examples, an air duct assembly includes upper and lower pliable sheets, wherein one sheet is more air permeable than the other.

In some examples, an air duct assembly comprising two pliable sheets includes a removable airflow modifier that is coupled to a main supply air duct that delivers air to a passageway between the two sheets. Examples of such an airflow modifier includes, but is not limited to, a filter, airflow-turning vane or noise attenuator.

In some examples, an air duct assembly includes upper and lower sheets can be installed by installing the lower sheet after the upper sheet is attached to a main supply air duct.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An air duct assembly for connection to a vertically extending inlet duct, the air duct assembly comprising:
a pliable tube attached to the vertically extending inlet duct;
an upper sheet comprising a first pliable material, the upper sheet defining an inlet opening with a first separable joint extending along a perimeter of the inlet opening for connecting the upper sheet to the pliable tube;
a lower sheet comprising a second pliable material;
the first separable joint connecting the upper sheet to the pliable tube to place the vertically extending inlet duct in fluid communication with the inlet opening of the upper sheet;
a second separable joint coupling the upper sheet adjacent the lower sheet, the second separable joint, comprising:
a first channel matingly engaged by a first portion of the upper sheet; and
a second channel matingly engaged by a first portion of the lower sheet, wherein the first portion of the upper sheet is spaced-apart from the first portion of the lower sheet; and
a third separable joint coupling the upper sheet adjacent the lower sheet, the second separable joint and the third separable joint being spaced-apart from each other with the upper sheet and the lower sheet extending therebetween, the second and third separable joints each connected with a support to position the upper sheet adjacent the supports generally laterally relative to the inlet duct, and the upper sheet, the lower sheet, and the separable joints defining an enclosed horizontally extending air passageway therebetween.

2. The air duct assembly of claim 1, wherein the third separable joint includes a track defining a first channel and a second channel, wherein the upper sheet matingly engages the first channel of the track, and the lower sheet matingly engages the second channel of the track.

3. The air duct assembly of claim 1, wherein the second separable joint includes a pliable fastener.

4. The air duct assembly of claim 1, wherein the first separable joint includes a pliable fastener.

5. The air duct assembly of claim 1, further comprising:
a first pliable end panel extending between the upper sheet and the lower sheet; and
a fourth separable joint coupling the first pliable end panel to at least one of the upper sheet or the lower sheet.

6. The air duct assembly of claim 5, wherein the fourth separable joint includes a pliable fastener.

7. The air duct assembly of claim 5, further comprising:
a second pliable end panel extending between the upper sheet and the lower sheet, wherein the inlet opening is between the first pliable end panel and the second pliable end panel; and
a fifth separable joint coupling the second pliable end panel to at least one of the upper sheet or the lower sheet.

8. The air duct assembly of claim 1, wherein the upper sheet and the lower sheet have different levels of air permeability.

9. The air duct assembly of claim 8, wherein the upper sheet is substantially impermeable to air.

10. The air duct assembly of claim 1, further comprising an airflow modifier connected to the first separable joint.

11. The air duct assembly of claim 10, wherein the airflow modifier comprises a filter.

12. The air duct assembly of claim 10, wherein the airflow modifier comprises a turning vane.

13. The air duct assembly of claim 10, wherein the airflow modifier comprises a sound attenuator.

14. The air duct assembly of claim 1, further comprising a permeable member located across the inlet to modify airflow or air pressure to minimize flutter of the lower sheet.

15. The air duct assembly of claim 14, wherein the permeable member comprises a fabric sheet attached to the second separable joint.

16. The air duct assembly of claim 14, wherein the permeable member has a first area of a first porosity and a second area of a second porosity.

17. An air duct assembly for connection to a vertically extending inlet duct, the air duct assembly comprising:
a pliable tube attached to the vertically extending inlet duct;
an upper sheet made of a first pliable material, the upper sheet defining an inlet opening with a first separable joint extending along a perimeter of the inlet opening for connecting the upper sheet to the pliable tube;
a lower sheet made of a second pliable material;
the first separable joint connecting the upper sheet to the pliable tube, thereby placing the vertically extending inlet duct in fluid communication with the inlet opening of the upper sheet;
a second separable joint coupling the upper sheet adjacent the lower sheet, the second separable joint comprising a track defining:
a first opening through which a first portion of the upper sheet extends; and
a second opening spaced-apart from the first opening and through which a first portion of the lower sheet extends; and
a third separable joint coupling the upper sheet adjacent the lower sheet, wherein the second separable joint and the third separable joint are spaced-apart from each other with the upper sheet and the lower sheet extending therebetween, the second and third separable joints each connected with a support to orient the respective separable joint at a predetermined position for coupling the upper and lower sheets, and the upper sheet, the lower sheet, and the separable joints defining an enclosed horizontally extending air passageway therebetween.

18. The air duct assembly of claim 17, wherein the third separable joint includes a track defining a first channel and a second channel, wherein the upper sheet matingly engages the first channel of the track, and the lower sheet matingly engages the second channel of the track.

19. The air duct assembly of claim 17, wherein the second separable joint includes a pliable fastener.

20. The air duct assembly of claim 17, wherein the first separable joint includes a pliable fastener.

21. The air duct assembly of claim 17, wherein the upper sheet and the lower sheet have different levels of air permeability.

22. The air duct assembly of claim 17, further comprising an airflow modifier connected to the first separable joint.

23. A method of installing an air duct assembly to a vertically extending inlet duct, wherein the air duct assembly includes a pliable tube, an upper sheet made of a first pliable material and a lower sheet made of a second pliable material, the upper sheet defining an inlet opening, the method comprising:
coupling the pliable tube to the vertically extending inlet duct;
coupling the upper sheet to the pliable tube via a separable joint extending along a perimeter of the pliable tube, thereby placing the vertically extending inlet duct in fluid communication with the inlet opening;
supporting a track relative to a structure to orient the track at a predetermined position, the track having a first channel and a second channel;
coupling a first edge of the lower sheet at the first channel of the track;
coupling a first edge of the upper sheet at the second channel of the track; and
coupling a second edge of the lower sheet at a second edge of the upper sheet to create an enclosed horizontally elongate air passageway, wherein the first edge of the lower sheet at the first channel of the track is spaced-apart from the first edge of the upper sheet at the second channel of the track.

24. The method of claim 23, wherein coupling the upper sheet to the pliable tube involves the use of a pliable fastener.

25. The method of claim 23, further comprising removably fastening a first pliable end panel and a second pliable end panel to at least one of the upper sheet or the lower sheet.

26. The method of claim 25, wherein coupling the second edge of the lower sheet at the second edge of the upper sheet involves the use of a pliable fastener.

27. The air duct assembly of claim 17, further comprising:
a first pliable end panel extending between the upper sheet and the lower sheet;
a fourth separable joint with a pliable fastener coupling the first pliable end panel to at least one of the upper sheet or the lower sheet;
a second pliable end panel extending between the upper sheet and the lower sheet, wherein the inlet opening is between the first pliable end panel and the second pliable end panel; and
a fifth separable joint coupling the second pliable end panel to at least one of the upper sheet or the lower sheet.

28. The air duct assembly of claim 1, further comprising a divider to enable the first portion of the upper sheet to be spaced-apart from the first portion of the lower sheet.

29. The air duct assembly of claim 1, wherein the support is a stationary support.

30. The air duct assembly of claim 1, wherein the pliable tube is attached to the vertically extending inlet duct via a clamp.

* * * * *